United States Patent [19]
Kojabashian

[11] 3,880,500
[45] Apr. 29, 1975

[54] MIRRORS HAVING STRETCHED REFLECTIVE SHEET MATERIALS

[75] Inventor: Charles Kojabashian, Sudbury, Mass.

[73] Assignee: American Velcro, Inc., Manchester, N.H.

[22] Filed: Dec. 28, 1973

[21] Appl. No.: 429,279

[52] U.S. Cl. .................. 350/310; 350/288; 156/60
[51] Int. Cl. .............................................. G02b 5/08
[58] Field of Search ........... 350/288, 299, 310, 295; 156/60

[56] References Cited
UNITED STATES PATENTS

| | | | |
|---|---|---|---|
| 3,687,524 | 8/1972 | Martinez | 350/288 |
| 3,733,116 | 5/1973 | Hutchinson | 350/288 |
| 3,757,479 | 9/1973 | Martinez | 350/288 |

*Primary Examiner*—Ronald L. Wibert
*Assistant Examiner*—Michael J. Tokar
*Attorney, Agent, or Firm*—Pennie & Edmonds

[57] ABSTRACT

A planar mirror having at least one reflective surface formed by a metallized thin film reflective sheet material in a stretched condition having a frame defined by peripheral members connected in end-to-end relation, each member having a neutral axis of substantially zero deflections due to bending forces applied thereto. First and second similar thin film reflective sheet materials are secured over each side of the frame and maintained in substantially identically stretched conditions such that the bending and compressive forces on the frame members due to the tension in each film are balanced and in equilibrium with the forces caused by the tension in the other film thereby resulting in continuous and optically correct reflecting mirror surfaces on each side of the frame. A method of producing such optically correct mirrors is also disclosed.

12 Claims, 5 Drawing Figures

MIRRORS HAVING STRETCHED REFLECTIVE SHEET MATERIALS

BACKGROUND OF THE INVENTION

1. Field of the Invention

This invention relates to improvements in mirrors having a reflecting surface provided at least on one side with a metallized reflective sheet material, such as aluminized polyester, in a stretched condition over a supporting frame.

2. Description of the Prior Art

It has been generally known that lightweight planar mirrors can be produced by stretching over one surface or over a generally peripheral ridge on a supporting frame, a thin flexible sheet material having a reflective surface. Examples of different constructions of such mirrors are found in various patents. For example, British Pat. No. 841,875 to General Electric Company Limited, London, relates to a reflector having a reflecting polymeric material attached to a base material. Other related patents include U.S. Pat. No. 3,180,220 to Jeffree; U.S. Pat. No. 3,434,181 to Benzies; U.S. Pat. No. 3,552,835 to Benzies; and U.S. Pat. No. 3,608,179 to Jeffree, et al. Examples of various patents disclosing different frame constructions but unrelated to the production of lightweight mirrors are: U.S. Pat. Nos. 1,775,717 to Everhard; 2,219,595 to Long; 2,255,151 to Clements; 2,260,176 to Ford; 2,256,802 to Voege; 3,012,362 to Blindeman; 3,028,638 to Goellner; 3,133,375 to Myren; 3,154,453 to Demke, et al.; and 3,494,409 to Prechtl, et al.

One of the most important features in the construction of these mirrors is to take extraordinary care that the frames be flat and true or else the stretched sheet material will give a distorted image. The portion of the frame over which the reflective sheet material is stretched must be extremely flat, co-planar, and continuous. Even minute irregularities in the frame or in the upper surface portion of the generally peripheral ridge over which the sheet material is stretched results in magnified distortions in the mirror surface with a loss of optical accuracy. Minor inaccuracies in the frame construction or deflections in the frame due to compressive and bending forces caused by the stretched condition of the film result in great distortions in the mirror surface. For example, deviations up to 0.001 inch in co-planarity of the peripheral ridge around the frame were found to be detrimental to the mirror quality.

For this reason, the preferred construction of mirrors of this type has been extruded aluminum, generally inwardly open channel members defining the frame. The channel members surround and hold a lightweight reinforcing substrate member between upper and lower flange members of the channel. The frame is bent into the desired shape with the end portions fastened together, or it is mitered and welded at its corners with great care taken to obtain a true planar frame so that when the reflective film is stretched over the bead, it will be truly flat so that the optical correctness required to produce a distortion-free image is realized.

Once the film is stretched over the bead and placed in tension, it produces severe bending and twisting forces on the frame and it is the function of the reinforcing substrate to alleviate these forces and distribute them uniformly along the frame. The substrate generally used has been a rigid foam plastic substrate which did not provide the requisite reinforcement and did not facilitate production of an optically correct mirror. To resort to a thicker substrate member involved crimping or pinching the substrate to reduce its thickness along the periphery to fit it within the flange members of the channel members. However, even after criping the substrate, it was found that the foamed plastic was not sufficiently resilient to provide a tight fit in the channel members. This did not provide sufficient stiffening for the frame. To use a thicker substrate member or heavier frame members would increase the weight of the mirrors, thus offsetting some of their primary advantages. U.S. Pat. No. 3,733,116 to Hutchinson relates to a planar mirror of the type described having an optically correct reflecting mirror surface provided by the incorporation of a resilient wedge-like member gripped between an upper flange member of each frame and the supporting substrate member such that compressive reaction forces of the resilient members are in balanced equilibrium with compressive and bending forces of the film. Thus, through the incorporation of an additional component in the form of the wedge-like member, a continuous and optically correct reflecting mirror surface is created.

I have invented an improvement in such lightweight mirrors which obviates the necessity for a reinforcing substrate and which provides the equilibrium relationship between the compressive and bending forces of a stretched thin film material by placing dual sheet materials on opposite sides of the frame. By placing these materials in substantially equally and oppositely spaced relation from the centroid of the frame a continuous and optically correct reflecting surface is provided on at least one side of the frame.

SUMMARY OF THE INVENTION

Broadly stated, the invention relates to a planar mirror having at least one reflective surface formed by a metallized thin film reflective sheet material in a stretched condition over a supporting frame. The mirror comprises a frame defined by elongated peripheral members connected in end-to-end relation with each member having a neutral axis of substantially zero deflection due to compressive and bending forces applied to the member. A first metallized thin film sheet material is secured over one side of the frame in a stretched condition and a second thin film sheet material is secured to the opposite side of the frame in a stretched condition with means provided for securing each sheet material to peripheral portions of the frame while maintaining them in a stretched condition over the frame. The sheet materials are substantially similar and are maintained in substantially identical stretched conditions such that the bending forces on the frame members due to each stretched sheet material are in balanced equilibrium with the bending forces of the other stretched sheet material. The state of equilibrium of the material provides a continuous and optically correct reflective surface on at least one side of the frame without the need for additional reinforcing means. This is due to the resulting dimensional stability in the frame. It is particularly desirable to provide identical reflective thin film materials on both sides of the frame as this will result in achievement of a high degree of equilibrium due to the identical nature of the materials. Also, by providing such metallized reflective materials on either side of the frame, a dual surface mirror may be provided.

The invention is particularly useful in creating high quality lightweight thin film mirrors of large dimensions which previously were not possible with only a simply constructed lightweight frame. This was particularly due to the difficulty which was encountered in maintaining stability in the lightweight frames while simultaneously minimizing their weight.

Mirrors produced according to the present invention are preferably of lightweight construction with elongated light frame members similar to those of the prior art. These mirrors are relatively inexpensive and are devoid of the problems encountered in the production of accurate and optically correct mirrors according to the prior art. Also heavier frame constructions and additional reinforcement means are avoided. However, a unique feature of my invention is that it may yet be utilized in combination with improvements of the prior art to provide even greater frame stability in addition to the improvements already known.

The invention also relates to a new and improved method of producing such mirrors having at least one reflective surface on at least one side of the frame. The reflective surface is produced by a thin film reflective sheet material. The method comprises producing a frame by connecting elongated peripheral frame members in end-to-end relation. Each frame member has a neutral axis of substantially zero deflections due to bending of the member. The method further comprises providing peripheral surface portions which form a total surface portion about the periphery of the frame. The method further comprises bonding a thin film reflective sheet material to a first peripheral surface portion of the frame and then bonding a second thin film sheet material similar to the first sheet material to a second surface portion of the frame. The method further comprises trimming the excess film along the edge on each side of the frame, and then shrinking the films to provide a finished, optically correct mirror surface on at least one side of the frame. In the preferred embodiment, each sheet of thin film material has a reflective surface and the resulting optically correct mirror is two-sided. Also in the preferred embodiment, the frame is formed by members which are constructed of either extruded aluminum or a synthetic plastic material. The thin film material is preferably shrunk by heating.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
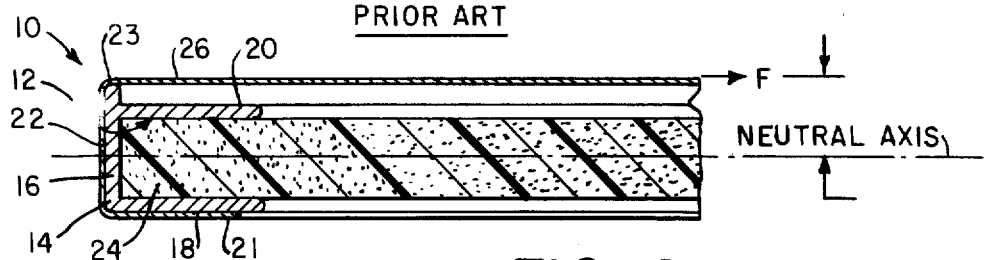
FIG. 1 is a cross-sectional view of a mirror constructed according to the prior art.

Referring to the drawings, there is shown in FIG. 1 a thin film mirror 10 constructed according to the prior art. A frame 12 is comprised of members 14, connected in end-to-end relation, with each member 14 having a side member 16 and spaced apart opposed flange members 18 and 20 extending from the side member 16 toward the central portion of the frame. A thin metallized film 26 is stretched over one face of the frame 12 over a peripheral bend 23 and secured to the outer side surface portion 22 of side member 16. Alternately it may be secured to the rear face portions 21 of flange members 18 as shown. In either arrangment, these surface portions comprise a peripheral surface portion of the entire frame.

The resulting mirror surface has a substantial degree of reflectivity due to the stretched condition of the reflective film. The reflective flim generally comprises a vacuum deposited metallized high quality mirror grade polyester film such as the types which are marketed under the trademarks MELINEX or VAPCOLEX, for example. The film is generally secured over the frame and then shrunk, preferably by heating to provide a reflective mirror surface. A backing member in the form of substrate 24 such as a polyurethane lightweight foamed plastic, is generally positioned between the flange members 18 and 20 to provide reinforcement for the frame. This reinforcement serves to minimize distortions due to compressive and bending forces caused by the film in its stretched condition.

Figure 2:
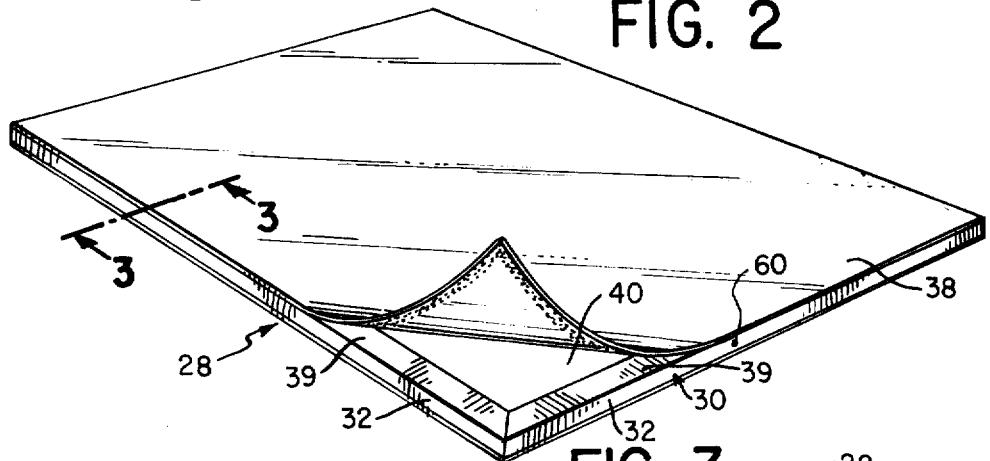
FIG. 2 is a perspective view of a mirror constructed according to the present invention.

Referring now to FIG. 2, there is illustrated a lightweight mirror 28 constructed according to the present invention. Frame 30 is preferably polygonal having any number of sides. For example, the mirror may have a rectangular configuration as shown. Alternately it may be triangular, octagonal, circular, or any other geometric shape. Frame 30 is comprised of individual frame members 32 which are preferably of extruded aluminum construction, but may also be constructed of other materials, such as a synthetic plastic material, steel, etc. The members 32 are connected in end-to-end relation in a known manner. A preferred means of connecting the frame members is shown in FIG. 2 wherein the end portions are mitered or bevelled. The members are positioned in angular relationship and the end portions are fusion-welded or connected in any other known manner.

Figure 3:
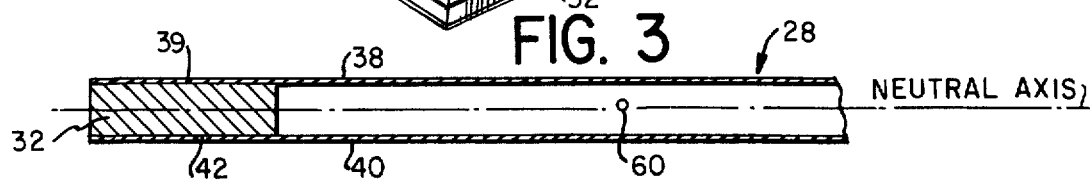
FIG. 3 is a cross-sectional view taken along lines 3—3 of FIG. 2.

Referring now to FIG. 3, there is shown a cross-sectional view taken along lines 3—3 of FIG. 2. A first sheet 38 of metallized thin film material is positioned on a first side of the frame while a second sheet 40 of metallized thin film material is positioned on the opposite side of the frame. The thin sheet material is preferably a polyimide or a polyester such as polyethylene terephthalate having a vacuum deposited reflective layer of aluminum, silver, chromium and the like on one surface. The thin film sheet materials are maintained in a stretched condition and secured preferably by a suitable adhesive such as contact cement, to peripheral opposed surface portions 38 and 42 respectively, as shown. If the materials are secured to these surface portions, the adhesively secured peripheral portions will generally not exhibit the mirror surface qualities exhibited by the central mirror surface portions. However, these portions may either be covered with trim members, or alternately, they may be left exposed as shown.

Figure 4:
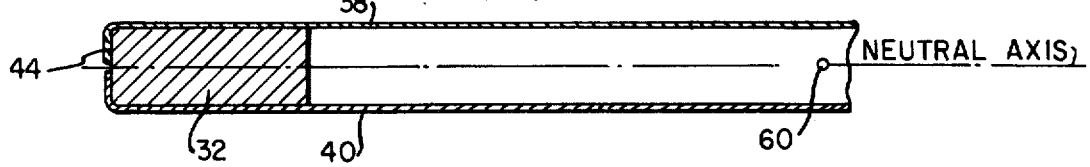
FIG. 4 is a cross-sectional view similar to FIG. 3, of an alternate embodiment of the invention.

Referring now to FIG. 4, there is shown a cross-sectional view of an alternate embodiment of the mirror shown in FIG. 2. In this embodiment the metallized thin film is adhesively secured to a part of the outer side surface portion 44 of each frame member 32 so as to provide a bend in the film about corner portions of the frame to provide a secure positioning of the film. Thus, when the film is subjected to a suitable shrinking operation it is tightly positioned about each corner portion of the frame.

Figure 5:
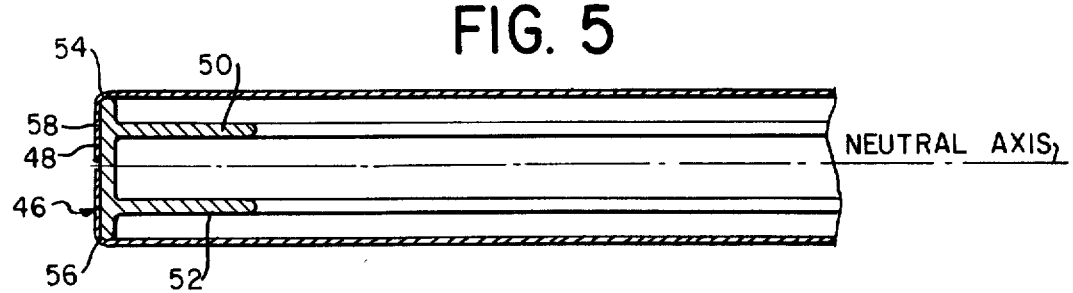
FIG. 5 is a cross-sectional view similar to FIGS. 3 and 4, of another alternate embodiment of the invention.

Referring now to FIG. 5, there is shown a second alternate embodiment of the invention. Frame members 46 are comprised of side members 48 with dual opposed flange members 50 and 52 extending from the side members 48 toward the central portion of the frame and in spaced relation to form a channel-like configuration. A peripheral bead 54 and 56 is provided on each side of the frame and preferably comprises extensions of the side members 48 as shown in the drawing. A metallized thin film is secured to the outer side surface 58 of the frame as shown and maintained in a stretched condition across each side of the frame. The frame members are preferably of extruded aluminum and are constructed according to any of several known techniques. One means contemplated is to miter or bevel the end portions of each member. Then the members are fusion-welded together. Another technique is to cut several V-shaped notches in each flange of a single unitary member and bending the member at each notched portion to form a polygonal frame. The end positions of the single member are connected in a suitable manner such as by welding, riveting, etc.

In each of the embodiments described the thin film sheet material is preferably identical on both sides of the frame. Further, each of the sheet materials must be maintained in substantially identical stretched conditions such that the compressive and bending forces acting upon the individual frame members about the neutral axis due to the stretched condition of the film are substantially cancelled by the equal and opposite forces of the opposed thin film material thereby resulting in substantially zero net bending forces on the frame thereby resulting in superior dimensional stability of the frame. Thus, frame distortions are minimized and supporting members such as substrate 24 shown in FIG. 1, are not required. It should be understood, however, that the invention may be utilized with such additional supporting substrates to provide additional resistance to bending forces.

Each frame member 32 or 46 in the embodiment of FIG. 5 has a neutral axis of zero bending. The neutral axis lies in a plane passing through the centroid of the member and defines the portions which are not affected in terms of stresses or strains by bending and compressive forces acting on the member. The compressive and bending forces contemplated are those forces acting at a distance from the neutral axis of the frame members caused by the metallized film while it is maintained in a stretched condition. By maintaining identical or similar sheets of thin film material in similarly stretched conditions the bending reaction forces due to both films are therefore in such balanced equilibrium about the neutral axis of each frame member that the resulting mirror surface on either, or both sides of the frame, is uniform and optically correct without the necessity of providing additional frame structure to withstand these forces. In addition, where the thin film is identical on both sides of the frame and when both films are maintained in identical stretched conditions, balanced equilibrium is readily achieved and a two-sided uniform and optically correct mirror is provided. It has been found that the film forces may actually flex the frame members inwardly to a minor extent; however, deflections due to such forces are inward and parallel with the planes of the films. Thus these deflections are within substantially broad limits, of little consequence.

The type of frame members and cross-sectional configurations may be varied without departing from the scope of the invention. Also, it should be noted, as seen in FIGS. 3 and 4, an aperature 60 is generally provided in at least one frame member to permit expansion and contraction of the atmosphere within the frame due to changes in atmospheric conditions.

I claim:

1. A planar mirror having at least one reflective surface formed by a metallized thin film reflective sheet material in a stretched condition over a supporting frame comprising: a frame defined by peripheral members connected in end-to-end relation, each member having a neutral axis of substantially zero deflection due to bending forces applied to said member; a first metallized thin film reflective sheet material in a stretched condition over a first side of said frame; a second thin film sheet material in a stretched condition over the opposite side of said frame; means for securing each of said sheet materials to peripheral portions of said frame while maintaining them in a stretched condition over said frame, said sheet materials being substantially similar and maintained in substantially identical stretched conditions such that the bending and compressive forces on the frame members due to each stretched sheet material are in balanced equilibrium with the bending and compressive forces due to the other stretched sheet material and a continuous and optically correct reflecting mirror surface is thereby created on at least one side of the frame.

2. The mirror according to claim 1 wherein each thin film sheet material is a reflective sheet material, and thereby creates a continuous and optically correct reflective mirror on each side of said frame.

3. The mirror according to claim 2 wherein said thin film sheet material are metallized polyester reflective sheet materials and said mirror has opposite dual reflective surfaces.

4. The mirror according to claim 3 wherein said polyester thin film sheet materials are comprised of polyethylene terephthalate.

5. The mirror according to claim 4 wherein each of said frame members has a substantially rectangular cross-sectional configuration, a first forward peripheral surface portion on the first side of said frame and a second peripheral surface portion on the opposite side of the frame, and each member has a neutral axis of substantially zero deflection due to compressive and bending forces on the frame, said axis passing through a centroid of each frame member and extending along the length of said member, said materials being secured to the respective peripheral surface portions on each side of the frame.

6. The mirror according to claim 5 wherein each reflective sheet material is adhesively secured to the respective forward and rearward surface portions of the side frame members.

7. The mirror according to claim 4 wherein each frame member has an outer side surface portion and the side surface portions of each member define a peripheral side surface portion of the frame, and each sheet of thin film material is secured to a part of the side surface portion of each member and bent over a corner portion thereof while said materials are maintained in a stretched condition over each side of the frame.

8. The mirror according to claim 7 wherein each reflective sheet material is adhesively secured to the respective part of the peripheral side surface portions of the frame.

9. The mirror according to claim 1 wherein each peripheral frame member comprises a channel-like member having a cross-section defined by a peripheral side member extending laterally from a first surface of the frame to the second surface thereof, upper and lower flange members extending from said side member toward the central portion of the frame, a raised peripheral ridge on the outer side of each flange, and said stretched reflective materials are positioned over opposed side portions of the frame and maintained in said stretched condition over the peripheral ridge of each frame member and secured to the outer side surface of the peripheral side member of each channel-like frame member, said stretched reflective sheet materials being maintained in substantially similar stretched conditions such that the bending forces of each material are in balanced equilibrium thereby creating a continuous and optically correct reflecting mirror surface on at least one side of the frame.

10. The mirror according to claim 9 wherein each thin film sheet material is a reflective sheet material, and a continuous and optically correct reflecting mirror surface is thereby provided on both sides of said frame.

11. The mirror according to claim 10 wherein a supporting substrate member is positioned within the frame and gripped between the upper and lower flange members of each frame member so as to provide support for said frame thereby resulting in improved balanced equilibrium between the bending and compressive forces caused by the stretched condition of each thin film sheet material.

12. In a planar mirror having at least one reflective surface formed by a metallized polyester reflective sheet material supported over a peripheral frame, the combination which comprises: a plurality of elongated members connected in end-to-end relationship to define said frame, each member having a forward surface portion and a rearward surface portion defining the periphery of said frame, each frame member having a neutral axis of substantially zero deflections due to compressive and bending forces applied to said member, a first sheet of metallized thin film reflective polyester supported over one side of said frame and secured along the periphery thereof, a second sheet of metallized thin film reflective polyester supported over the second side of said frame and secured along the periphery thereof, said sheet materials being substantially identical materials and being maintained in substantially equal stretched conditions over each side of said frame such that bending and compressive forces on the frame members due to each stretched film material are substantially cancelled thereby minimizing frame distortion and resulting in a dimensionally stable frame and a uniform and optically correct mirror surface on each side of the frame.

* * * * *